United States Patent [19]

Hone

[11] Patent Number: 4,813,290

[45] Date of Patent: Mar. 21, 1989

[54] POWER TAKEOFF FOR MOTOR VEHICLE

[75] Inventor: Ronald D. Hone, Fairview, Tenn.

[73] Assignee: DNE Corporation, Brentwood, Tenn.

[21] Appl. No.: 146,958

[22] Filed: Jan. 22, 1988

[51] Int. Cl.$^4$ ............................ F16H 37/06; F16D 21/04
[52] U.S. Cl. ................................... 74/15.88; 192/48.91
[58] Field of Search .................... 74/15.8, 15.82, 15.84, 74/15.88; 192/48.91

[56] References Cited

U.S. PATENT DOCUMENTS

| | | | | |
|---|---|---|---|---|
| 1,258,883 | 3/1918 | Farmer | ............... | 74/15.88 |
| 1,862,400 | 6/1932 | Herman | ............... | 74/15.88 |
| 2,231,144 | 2/1941 | Wagner | ............... | 74/11 |
| 2,424,360 | 7/1947 | Martin | ............... | 74/11 |
| 2,494,111 | 1/1950 | Wagner | ............... | 74/15.88 |
| 2,807,962 | 10/1957 | Howlett | ............... | 74/15.88 |
| 3,049,929 | 8/1962 | Wagner | ............... | 74/15.2 |
| 3,241,628 | 3/1966 | Thomas | ............... | 74/15.8 X |
| 4,604,908 | 8/1986 | Dolan | ............... | 74/15.88 |

Primary Examiner—Allan D. Herrmann
Attorney, Agent, or Firm—Luedeka, Hodges & Neely

[57] ABSTRACT

An improved power takeoff unit for a motor vehicle including a transition member, a drive shaft means and a spur gear means, each provided with clutch teeth occupying a common cylindrical space and being disposed contiguously, and shiftable annular gear means engaging selected ones of said transition member, drive shaft means and spur gear means.

3 Claims, 6 Drawing Sheets

POWER TAKEOFF FOR MOTOR VEHICLE

FIELD OF INVENTION

This invention relates to power takeoffs for motor vehicles, especially for light to light-heavy trucks having automatic transmissions.

BACKGROUND OF INVENTION

Power takeoffs for motor vehicles, are designed to utilize the power train of the motor vehicle to drive auxiliary mechanisms either mounted on or carried by the vehicle. Examples of such auxiliary equipment are winches, hydraulic lifts, etc. Power takeoffs for manual transmissions are very common in the art. Power takeoffs adaptable for automatic transmissions are less prevalent and usually involve power takeoff from a gear inside the automatic transmission or from the fan belt section of the engine. In view of the complicated nature of modern motor vehicle engines, the large number of auxiliary elements attached to such engines and the relatively small space within the engine compartment, attaching power takeoff units to the fan belt section of a motor vehicle is difficult from the standpoint of the lack of suitable space and the complications involved in acquiring driving connection to a belt driven by the engine. Power takeoffs from the gears in an automatic transmission suffer structural deficiencies that limit the use of power developed by the transmission.

Power takeoffs for vehicles with manual transmissions commonly are designed to be interposed within the drive train of the motor vehicle between the transmission and the differential. These takeoff units are notoriously complicated and bulky. In U.S. Pat. No. 2,494,111, there is proposed a power takeoff structure that is indicated to be relatively small and short so as to be conveniently mounted in the restricted space of the motor vehicle. The inventor in this patent, in order to achieve the desired results, was required to design a power takeoff element that was concentric with the driven input shaft and therefore requiring the design, manufacture and assembly of complicated positioning apparatus for maintaining the relative rotatable and nonrotatable postures of the power takeoff element relative to the constantly driven input drive shaft. This design further requires the use of a relatively complicated and expensive supporting sleeve for the power takeoff element. It will be clear hereinafter that the present invention provides a much more simple, effective power takeoff mechanism that is less expensive to manufacture, assemble and repair.

In like manner, U.S. Pat. No. 1,258,883 discloses a power transmission mechanism including a power takeoff element that is exceptionally bulky, complicated and therefore expensive to manufacture and to maintain. In addition, the power transmission path through the various elements of the unit disclosed in this patent follows tortuous paths that can result in deleterious torque forces and premature maintenance requirements.

Other prior power takeoff units provide for constant engagement of the power takeoff element such as in U.S. Pat. No. 3,049,929 with only selective engagement or disengagement of the motor vehicle drive shaft. Such units require additional control mechanisms for adjusting the output of the power takeoff unit in the course of its operation of the device that is to be powered by the unit.

SUMMARY OF INVENTION

In accordance with the present invention there is provided a power takeoff mechanism designed to be interposed between the transmission and differential of the motor vehicle. The present unit is compact in length and provided with housing means that renders it easy to mount rigidly to the transmission for efficient transfer of power from the transmission output shaft to the power takeoff shaft of the unit. The unit is made of relatively few moving parts so that it is of low cost to manufacture and of extended operating life. Further, the unit is designed for simple assembly and disassembly for repair.

In particular, the present power takeoff unit is well suited for use in light to light-heavy trucks, for example, up to and including one ton trucks, that have automatic transmissions.

In accordance with the present invention there is provided a power takeoff unit for a motor vehicle comprising a first housing adapted to be mounted directly to the output end of the transmission of the motor vehicle and to further receive a second housing which encloses certain of the operative elements of the power takeoff unit. Within the second housing there is mounted a first generally cylindrical transition member having first and second sections, the first of which is adapted to receive in driving relationship the output shaft of the transmission and the second section of which is provided with external circumferential clutch teeth. Also rotatably mounted within the housing is a drive shaft means having first, second, third and fourth sections, the first of which is adapted to drivingly receive the drive shaft of the motor vehicle, the second of which is adapted to engage bearings for rotatably mounting the gear within the housing, the third section including circumferential clutch teeth and the fourth section of which is of reduced diameter and received internally of the outboard end of the transition member, such that the drive shaft means is rotatably mounted in axial alignment with the transition member and their respective circumferential clutch teeth occupy and define a common cylindrical space. Also mounted within the housing and in circumscribing relationship to the first section of the transition there is provided a first spur gear having an annular collar which has defined on the external circumference thereof clutch teeth that occupy the aforesaid common cylindrical space, thereby positioning the three sets of clutch teeth in contiguous aligned relationship to one another with minimal spatial, separation of the teeth on the drive shaft and the spur gear from the clutch teeth on the transition member. The first spur gear is rotatably mounted on the first section of the transition member and meshes with a second spur gear means also rotatably mounted within the housing and including a power takeoff shaft that projects from the housing to engage a hydraulic pump or other power unit. Within the housing there is provided also a shift ring having internal clutch teeth that are of a dimension suitable to selectively engage simultaneously the clutch teeth of the first spur gear or the clutch teeth of drive shaft means with the clutch teeth on the transition member to thereby selectively connect the first spur gear (power takeoff) or the drive shaft means (vehicle drive shaft) in driven relationship to the transmission output shaft.

Notably, the several components of the present power takeoff unit are mounted within the housing and in operative engagement with the transition member to establish co-axial alignment of the several components, providing for the selective rotation of each relative to the other and ensuring concentricity of the several sets of clutch teeth. It is considered important that this alignment not only be provided axially of the elements, but also radially and linearly of the several elements To this end, among other things, there is provided abutting end portions of the transition member and the drive shaft means and appropriate bearing means disposed between such abutting ends thereby insuring correct positional relationship with these elements without the use of retaining rings as have been employed in the prior art.

Accordingly, it is an object of the present invention to provide a power takeoff unit for a motor vehicle wherein the unit is designed to be interposed in the drive train intermediate the transmission and differential of the vehicle.

It is another object of the present invention to provide a power takeoff unit which is relatively small in size and adapted to be securely mounted in position on a motor vehicle.

It is another object of the present invention to provide a power takeoff unit which comprises relatively few moving parts and which is designed for ready assembly and/or disassembly.

It is another object of the present invention to provide a power takeoff unit useful in connection with automatic transmissions for motor vehicles and which utilizes the full output torque of the transmission.

It is another object of the present invention to provide a power takeoff unit of the type described wherein the output power from the transmission is transmitted substantially in line to either the vehicle drive shaft or to the power takeoff unit.

It is another object of the present invention to provide a power takeoff unit which is operable when the drive shaft of the vehicle is disconnected from the power train.

It is another object of the present invention to provide a power takeoff unit including a first housing designed to be releasably secured to the transmission of a motor vehicle and a second housing adapted to receive the operative elements of the power takeoff unit and the drive shaft for the differential of the motor vehicle.

BRIEF DESCRIPTION OF THE DRAWINGS

Other objects and advantages of the invention will be recognized from the present disclosure including the specification and drawings in which.

DETAILED DESCRIPTION OF THE INVENTION

Figure 1:
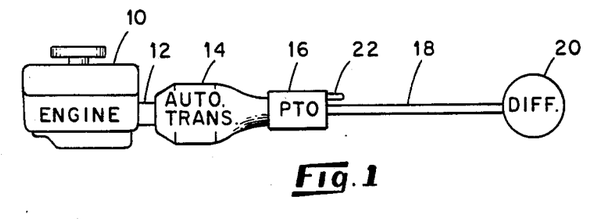
FIG. 1 is a schematic representation depicting the power takeoff unit, as interposed in the drive train of a motor vehicle.

Referring now to the Figures, in FIG. 1 there is schematically depicted a motor vehicle engine 10 having an output staff 12 to which there is engaged an automatic transmission 14, all of conventional design. The output of the automatic transmission has connected directly thereto a power takeoff unit 16 which in turn is connected to the drive shaft 18 through which power is delivered to the differential 20. In FIG. 1 there is schematically depicted a power takeoff shaft 22. The present invention can be installed on the motor vehicle at the time of manufacture of the vehicle, but most commonly is intended for retrofitting previously manufactured motor vehicles such as light to light-heavy trucks, i.e. one ton or less. In this latter situation, the truck is manufactured originally with the output shaft of the transmission connected through a universal joint to the drive shaft. In retrofitting the present invention to such a vehicle, the universal joint is first disconnected and then its two elements removed from the end of the transmission output shaft and the end of the drive shaft. As necessary, a portion of the drive shaft may be removed to shorten the drive shaft to accommodate the insertion of the present power takeoff unit. As will be more fully recognized by the description hereinafter, the present power takeoff unit has a "working" distance of approximately five inches which permits the unit to be inserted between the transmission output shaft and the end of the drive shaft without substantial reduction in the length of the drive shaft. In this manner there is substantially no alteration of the axial alignment of the drive shaft with respect to the transmission thereby insuring that there is no deleterious effect upon the alignment between the drive shaft and transmission by the presence of the present unit.

Figure 2:
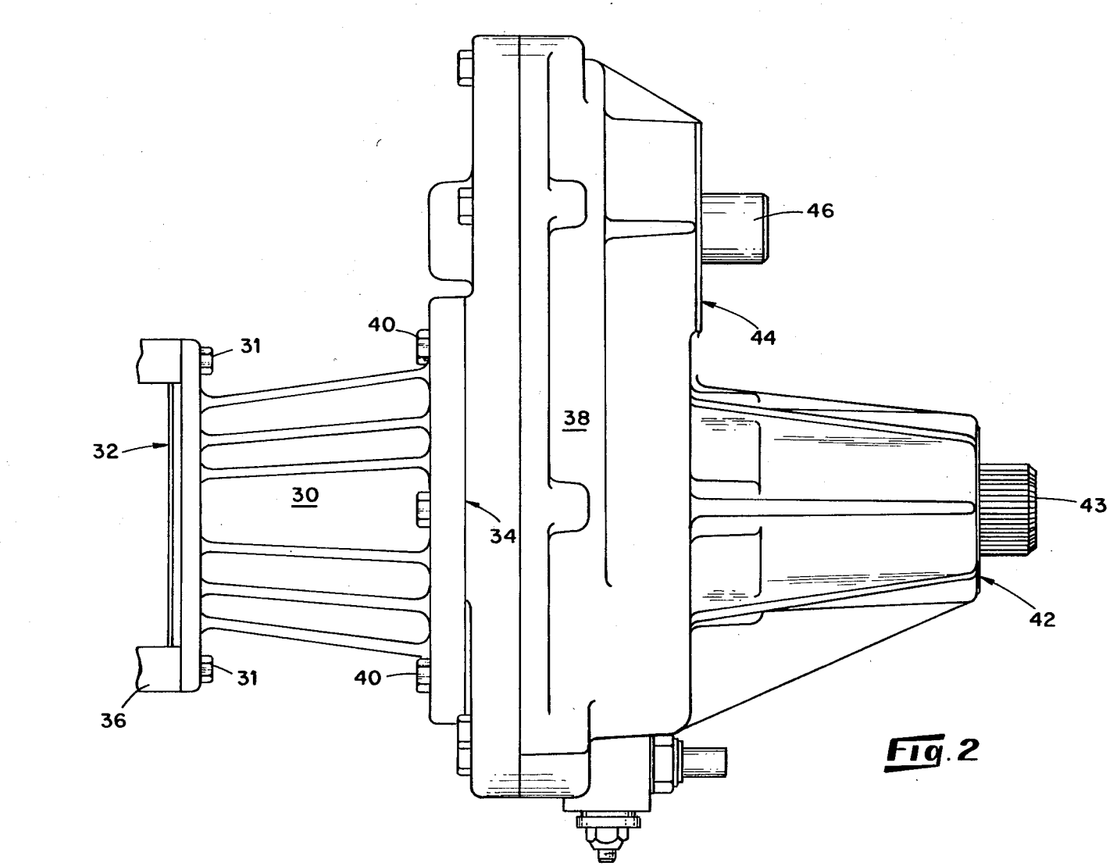
FIG. 2 is a plan view of one embodiment of the described power takeoff unit, and showing certain housing features thereof.
Figure 3:
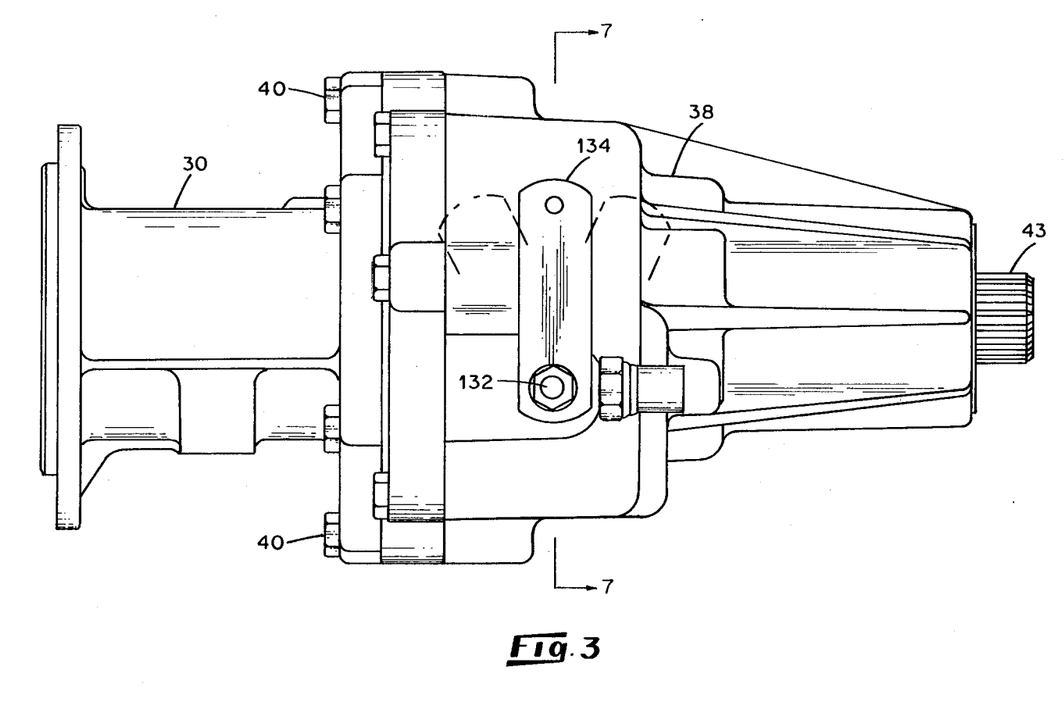
FIG. 3 is a side elevation view of the power takeoff unit depicted in FIG. 2.
Figure 4:
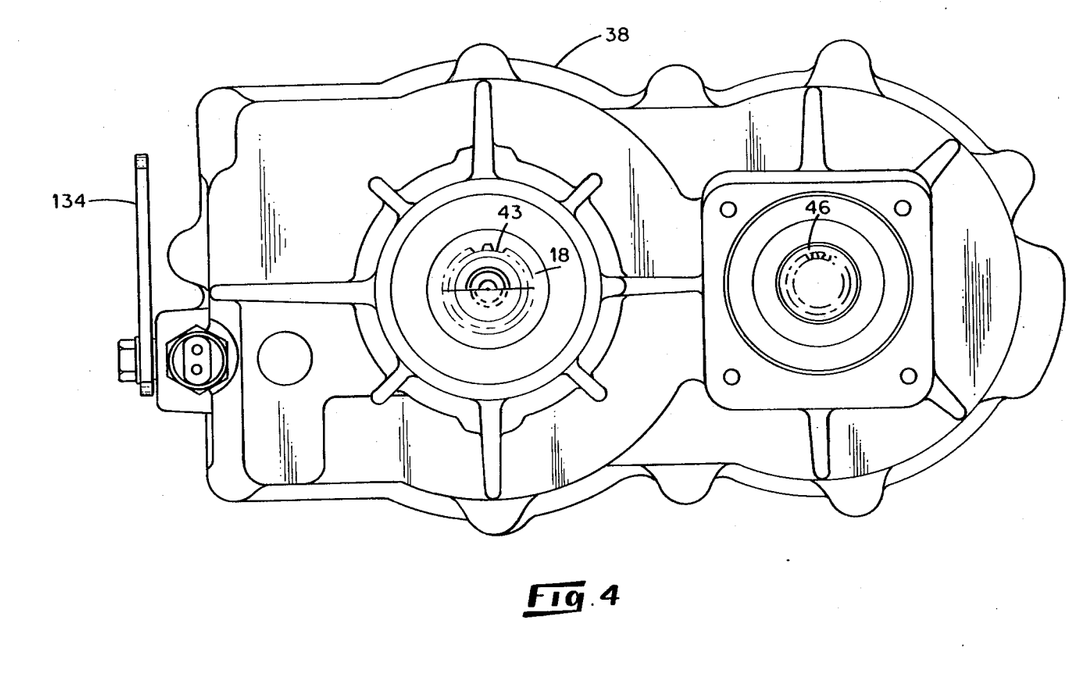
FIG. 4 is an end elevation view of the power takeoff unit of FIG. 3 as viewed from the vehicle differential.
Figure 5:
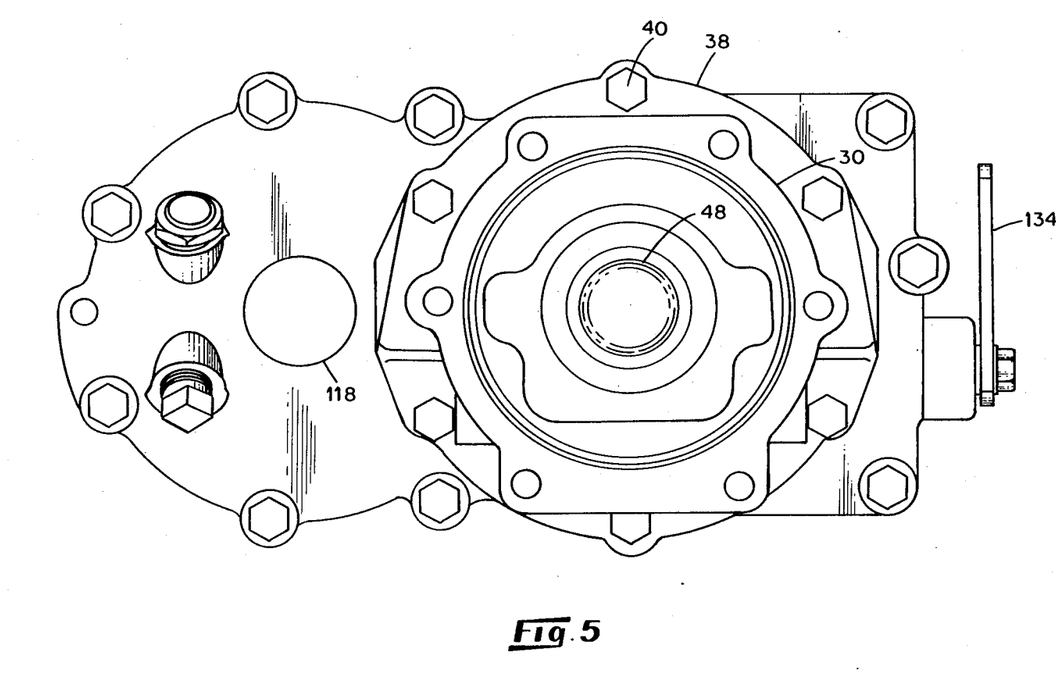
FIG. 5 is an end view of the power takeoff depicted in FIG. 2 as viewed from the vehicle transmission.

Referring specifically to FIG. 2, the present invention includes a first housing 30 of generally cylindrical geometry and being open at its opposite ends 32 and 34. The end 32 is adapted to be removably secured as by bolts 31 to the output end 36 of a transmission. The preferred form, the first housing 30 provides for multipivot connection to the transmission housing thereby providing efficient structural strength to permit the transfer of the full output torque from the transmission to the power takeoff unit. The outboard end 34 of the first housing 30 is removably secured to a second housing 38 as by means of bolts 40 such that the second housing 38 substantially closes the open end 34 of the first housing 30. The second housing 38 is provided with an output drive shaft port 42 and a further port 44 through which there projects a power takeoff shaft 22.

Figure 6:
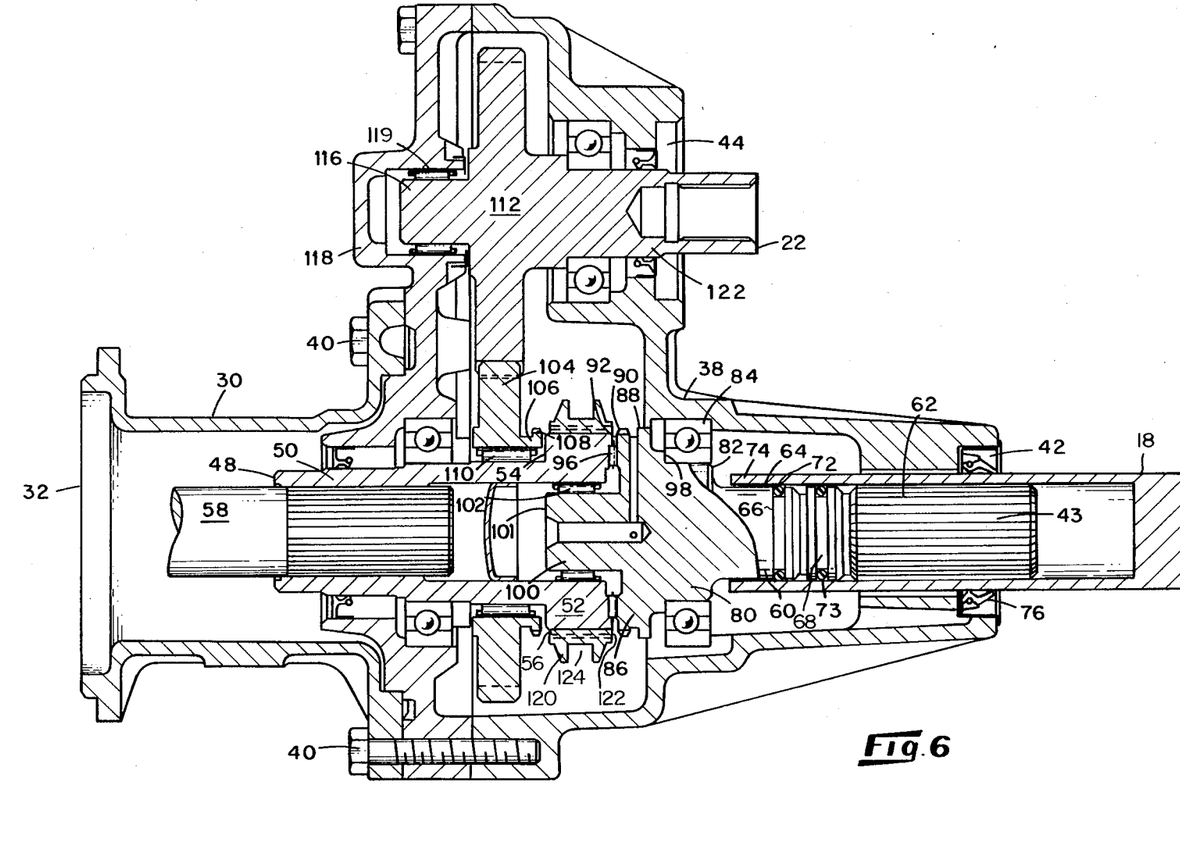
FIG. 6 is a fragmentary sectional view taken generally along the vertical mid plane of FIG. 2.

Referring specifically to FIG. 6, within the second housing 38 there is provided a transition member 48 of generally hollow, cylindrical geometry. This transition member 48 includes a first section 50 which transists to a second annular collar section 52 which is of larger diameter than the first section 50. The transition between the first and second sections of this transition member 48 defines an annular shoulder 54. The annular section 52 of the transition member 48 is provided on its circumference with clutch teeth 56 that have a longitudinal dimension that is parallel to but radially spaced from the alignment axis of the transmission output shaft 58 and the direct drive shaft 43.

Mounted within the second housing 38 and in axial alignment with the transition member 48 is a drive shaft 43. This drive shaft comprises a first section 60 that includes a splined portion 62 and a further portion 64 which is provided with circumferential grooves 66 and 68 which respectively receive O-rings 70 and 73. This first section of the shaft 43 is adapted to receive one end 74 of the direct drive 18. The end 74 of the drive shaft 18 is hollow and provided with internal splines which mate with the externally splined section 62 of the shaft 43. The external circumference of the drive shaft 18 is sealed with respect to the port 42 in the housing 38 as by an oil seal 76 and by the O-rings 72 and 73.

The drive shaft 43 is further provided with a second section 80 of larger diameter than the first section 60. The transition between these first and second sections defines an annular shoulder 82 which serves as a stop against movement of the end 74 of the drive shaft 18 onto the section 60 of the shaft 43. The drive shaft 43 is rotatably mounted within the housing 38 by means of a ball bearing 84 disposed between the housing and the outer circumference of the second section 80 of the shaft gear 43.

The shaft 43 is further provided with a third section 86 which comprises an enlarged annular collar that includes a first annular shoulder 88 and clutch teeth 90 disposed about the outer circumference of the section 86. It is noted that the clutch teeth 90 have a longitudinal dimension which is axially aligned with the longitudinal dimension of the clutch teeth 56 on the shoulder 52 of transition member 48. Further, it is important to note that the clutch teeth 90 are contiguous to the clutch teeth 56, e.g. there being less than about ⅛ inch, and preferably about 1/16 inch of space separating the teeth 56 and 90. The forward end 92 of the section 86 defines an annular planar surface which is in a facing and contiguous relationship to the outboard end 94 of the transition member 48. These facing annular planar surfaces are substantially parallel to one another. Interposed between the surfaces is a roller bearing 96 that serves as a thrust bearing between the transition member 48 and the shaft 43 and further to assist in establishing the spatial relationship between these two elements. In this respect it is noted that movement of shaft 43 along its rotational axis is limited in the outward direction by the ball bearing 84 which bears against the annular shoulder 96 defined in the transition between sections 80 and 86 of the shaft 43. Movement of the shaft 43 in the opposite direction is limited by the roller bearing 96. Notably, no snap ring is employed in the mounting of the shaft 43 within the housing 38 thereby enhancing the ease of assembly of this shaft in the unit.

The shaft 43 is provided with a fourth section 100 comprising a reduced diameter stub shaft 101 that is rotatably received within the interior of the collar portion 52 of the transition member 48. There is provided a needle bearing 102 in circumscribing relationship to the section 100 of the shaft 43 and interposed between such section and the internal circumference of the collar 52. This bearing 102 serves the dual function of rotatably supporting the shaft 43 with respect to the collar 52 and further ensures the concentricity of collar 52 with respect to the shaft 43, hence ensuring the concentricity of the clutch teeth 56 on the collar 52 with the clutch teeth 90 on the section 86 of shaft 43.

A spur gear 104 is rotatably mounted on the outer circumference of the first section 50 of the transition member 48. This spur gear 104 is provided with a first annular collar 106 that is further provided with clutch teeth 108 around the circumference thereof. These clutch teeth 108 are substantially identical to the clutch teeth 90 and the clutch teeth 56. Further, the clutch teeth 108 have a longitudinal dimension that is aligned with the longitudinal dimension of the clutch teeth 56 and 90. Further, the clutch teeth 108 occupy the same imaginary cylindrical space as the clutch teeth 56 and 90. Importantly, the clutch teeth 108 are contiguous to the clutch teeth 56 on the side thereof opposite the clutch teeth 90. Less than about ⅛ inch, and preferably about 1/16 inch of space separates the clutch teeth 108 from the teeth 56. Roller bearing means 110 is interposed between the outer circumference of the section 50 of transition member 48 and the inner circumference of the spur gear 104. This bearing means 110 not only provides for rotational movement between the spur gear 104 and the transition member 48 but also ensures concentricity between the spur gear clutch teeth 108 and the clutch teeth 56 and 90 so that the three sets of clutch teeth occupy a common imaginary cylindrical space. The spur gear 104 further meshes with a second spur gear means 112 that is rotatably mounted within the housing 38 as by ball bearings 114. Further rotational mounting of the spur gear 112 within the housing 38 is provided by means of a reduced diameter section 116 of the gear 112, such reduced diameter section 115 being received within an appropriate portion 118 of the housing 38. Needle bearing means 119 are interposed between the section 116 and the housing portion 118 to provide alignment and rotational support for the gear 112 within the housing The gear 112 is further provided with a section 122 which defines the power takeoff shaft 22 which projects through the port 44 and the housing 38 to receive a connection to the auxiliary mechanism to be driven.

Figure 7:
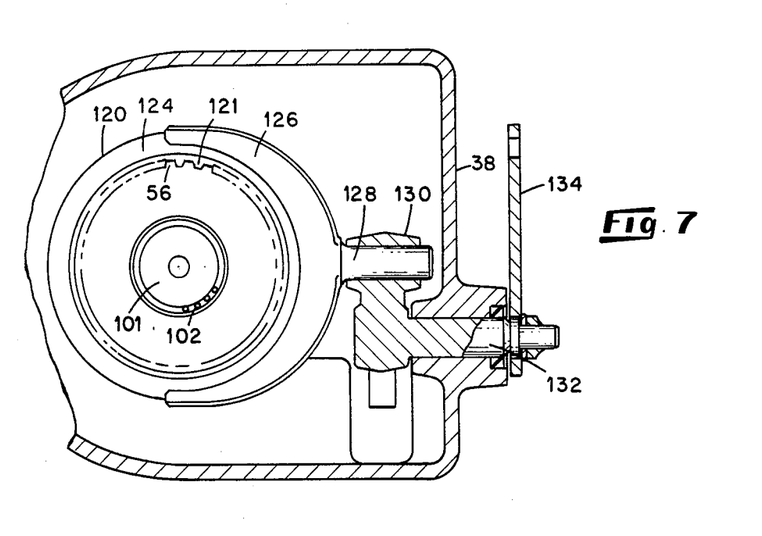
FIG. 7 is a fragmentary sectional view taken along the line 7—7 of FIG. 3.

As best seen in FIGS. 6 and 7, there is provided a shift ring 120 in circumscribing relationship to the collar section 52 of the transition member 48. This ring is provided with internal spline clutch teeth 122 that are adapted to mesh with the clutch teeth 108, 56 and 90. There is defined around the outer circumference of the shift ring 120 an annular channel 124 which receives a yoke 126 (FIG. 7) therein. This yoke 126 is rotatably mounted by an integrally formed stub shaft 128 in an arm 130 which in turn has a stub shaft 132 that is rotatably mounted in the housing 38 and projects therefrom to receive a shift lever 134.

There is an importance to note that the width of the shift ring 120 is essentially equal to the longitudinal dimension of the clutch teeth 56 on the annular portion 52 of the transition member 48. It will be recognized that upon the movement of the shift lever 134 acting through the yoke 126 the shift ring 120 can be moved to the left or right as viewed in FIG. 6. When the ring is so moved by as much as approximately ¼ inch, it will engage the clutch teeth 108 or the clutch teeth 90, depending upon the direction in which the shift ring 120 is moved, thereby locking such clutch teeth in rotational driven relationship to the transition member 48. In this manner, the torque force generated at the output shaft 58 of the transmission is transmitted through the transition member 48 and the shift ring 120 to either the clutch teeth 108 or the clutch teeth 90, thence transmitted to either the power takeoff shaft 22 or the vehicle drive shaft 18.

What is claimed is:

1. A power takeoff unit for a motor vehicle having a transmission including an output shift, and a drive shaft axially aligned with said transmission output shaft comprising:

first housing means of generally cylindrical geometry having open opposite ends, one of such ends being adapted to be releasably mounted to said transmission and in encompassing relationship to said transmission output shaft;

second housing means adapted to be releasably secured to that open end of said first housing means outboard of said transmission and defining an output drive shaft port disposed opposite to and in axial alignment with said transmission output shaft;

a transmission member disposed within said first housing and extending into said second housing, said first shaft means comprising a first elongated hollow cylindrical section internally splined to receive therein said transmission output shaft in driving engagement therewith and a second collar section of larger diameter than said first section and integrally formed therewith, the transition from said first section to said second section defining an annular shoulder, said second section including clutch teeth disposed on the outer circumference thereof, said clutch teeth having a longitudinal dimension that is parallel to, but laterally displaced from, the axial dimension of said transmission output shaft, first bearing means disposed between said first housing means and said first section of said transition member and rotatably mounting said transition member within said first housing;

output drive shaft means disposed within said second housing, said drive shaft means including a first elongated section extending from said output drive shaft port inwardly of said second housing, a second cylindrical section transisting from said first section and being of a larger diameter than said first section to define a first annular shoulder at said transition, a third cylindrical section integrally formed with said second section, and a fourth cylindrical section transisting from said third section and being of substantially smaller diameter than said third section to define a second annular shoulder at said transition, the diameter of said fourth section being slightly less than the internal diameter of said hollow transition member and being rotatably received therein whereby the outboard end of said transition member is disposed in abutting parallel planar relationship to said second shoulder means of said drive shaft, and said third section including clutch teeth defined on the outer circumference thereof said clutch teeth being identical in tooth design to said clutch teeth on said transition member and having a longitudinal dimension that is axially aligned with the longitudinal dimension of said clutch teeth on said transition member and further being disposed in contiguous abutting relationship with said clutch teeth on said transition member;

second bearing means disposed between second section of said drive shaft and said second housing means and rotatably mounting said drive shaft within said second housing;

third bearing means disposed in the plane of and between the outboard end of said transition member and the second annular transition shoulder between said third and fourth sections of said drive shaft;

fourth bearing means disposed in circumscribing relationship to the outer circumference of said fourth section of said drive shaft and between said fourth section and the internal circumference of the outboard end of said transition member;

first spur gear means disposed within said second housing and in circumscribing rotational relationship to said first section of said transition member and including a first annular collar section disposed in contiguous and abutting relationship to the annular shoulder defined in the transition between said first and second sections of said transition member, clutch teeth defined on the external circumference of said first collar section, said clutch teeth being identical in tooth design to said clutch teeth on said transition member and having a longitudinal dimension that is axially aligned with the longitudinal dimension of said clutch teeth on said transition member and further being disposed in contiguous abutting relationship with said clutch teeth on said transition member, whereby the clutch teeth on said transition member, said drive shaft, and said collar section of said third gear means are aligned in contiguous abutting relationship to one another in a common imaginary cylindrical space;

shift ring means disposed in encircling relationship to said second section of said transition member and having clutch teeth on the internal diameter thereof that mesh with the clutch teeth on the second section of said transition member, and including means defining an annular channel on the outer circumference thereof, said shift ring being essentially equal in width to the longitudinal dimension of said clutch teeth on said transition member, such width further being sufficient to permit said shift ring to engage simultaneously the clutch teeth on said transition member and the clutch teeth on said drive shaft or said clutch teeth on said annular collar of said third gear, but not sufficiently wide as to permit said shift ring to simultaneously engage the clutch teeth on all such three members;

fifth bearing means disposed in circumscribing relationship to the outer circumference of said first section of said transition member and between such transition member and said spur gear means to rotatably mount said spur gear on said transition member and to ensure concentricity between the clutch teeth on said collar section of said spur gear and the clutch teeth on said transition member;

second spur gear means disposed within said second housing and including a first section having gear teeth on the external circumference thereof that mesh with the gear teeth on said first spur gear, a second section defining a stub shaft that is rotatably mounted in said second housing, and a third section defining an output shaft that projects from said first section and through said second housing;

sixth bearing means disposed in circumscribing relationship to said output shaft section of said second spur gear means and rotatably mounting said output shaft in said second housing; and shift lever means operatively engaging said annular channel in said shift ring to selectively position said shift ring in engagement with said clutch teeth of said drive shaft or with said clutch teeth of said collar section of said spur gear to selectively drive said output drive shaft gear means or said output shaft section of said second spur gear means.

2. The power takeoff unit of claim 1, wherein said width dimension of said shiftable ring is less than about one inch.

3. The power takeoff unit of claim 2 wherein said width dimension of said shiftable ring is between about one-half inch and one inch.

* * * * *